(12) United States Patent
Ding et al.

(10) Patent No.: US 9,304,611 B2
(45) Date of Patent: Apr. 5, 2016

(54) DIRECTIONAL ULTRASOUND TRANSMITTING STYLUS

(71) Applicant: Luidia, Inc., San Carlos, CA (US)

(72) Inventors: Yao Ding, San Jose, CA (US); Jacob Harel, Redwood City, CA (US)

(73) Assignee: PNF CO., LTD., Belmont, CA (US)

(*) Notice: Subject to any disclaimer, the term of this patent is extended or adjusted under 35 U.S.C. 154(b) by 111 days.

(21) Appl. No.: 14/152,824

(22) Filed: Jan. 10, 2014

(65) Prior Publication Data

US 2014/0225875 A1    Aug. 14, 2014

Related U.S. Application Data

(63) Continuation of application No. PCT/US2012/045940, filed on Jul. 9, 2012.

(60) Provisional application No. 61/507,084, filed on Jul. 12, 2011.

(51) Int. Cl.
| | |
|---|---|
| *G06F 3/033* | (2013.01) |
| *H01L 41/00* | (2013.01) |
| *H02N 2/00* | (2006.01) |
| *G06F 3/0354* | (2013.01) |
| *G06F 3/043* | (2006.01) |

(52) U.S. Cl.
CPC .......... *G06F 3/03545* (2013.01); *G06F 3/0433* (2013.01)

(58) Field of Classification Search
CPC .. H04R 17/00; H04R 2499/11; G06F 3/0488; G06F 3/04883
See application file for complete search history.

(56) References Cited

U.S. PATENT DOCUMENTS

| 5,308,936 A | 5/1994 | Biggs et al. | |
|---|---|---|---|
| 5,591,945 A * | 1/1997 | Kent | 178/18.04 |
| 2004/0169439 A1* | 9/2004 | Toda | 310/328 |
| 2008/0309641 A1* | 12/2008 | Harel et al. | 345/173 |

FOREIGN PATENT DOCUMENTS

| WO | WO 01/55957 | 8/2001 |
|---|---|---|
| WO | WO 02/01466 | 1/2002 |

OTHER PUBLICATIONS

International Search Report and Written Opinion for PCT/US 2012/045940 (the parent) mailed Sep. 27, 2012.
IPRP for PCT/US 2012/045940 mailed Jan. 23, 2014.
Supplementary European Search Report and Opinion for EP Appl. No. 12811730.6, mailed Mar. 31, 2015, being national filing of PCT/US 2012/045940 (the parent).
Notification of First Office Action for Chinese Application No. 201280039300.X, mailed Feb. 2, 2016.

* cited by examiner

*Primary Examiner* — Alexander Eisen
*Assistant Examiner* — Nan-Ying Yang
(74) *Attorney, Agent, or Firm* — Kile Park Reed & Houtteman PLLC (57) ABSTRACT

A stylus that includes a tip portion that has a cavity. The cavity has a plurality of holes at a first end and a transmitter of acoustic, e.g., ultrasound waves at the end longitudinally opposite the first end. The tip portion has a tip. The tip end is less than a quarter of a wavelength from the exit ends of the holes. When the end of the tip is placed against a working surface, the acoustic waves travel from the transmitter through the cavity, exit the holes and travel less than a quarter of a wavelength to the working surface relatively close to the tip.

11 Claims, 7 Drawing Sheets

DIRECTIONAL ULTRASOUND TRANSMITTING STYLUS

RELATED PATENT APPLICATIONS

The present invention is a continuation of International Patent Application No. PCT/US12/45940 filed Jul. 9, 2012, titled A DIRECTIONAL ULTRASOUND TRANSMITTING STYLUS, the contents of which are incorporated herein by reference. International Patent Application No. PCT/US12/45940 claims priority of U.S. provisional Patent Application No. 61/507,084 filed Jul. 12, 2011 to first inventor Ding and titled DIRECTIONAL ULTRASOUND TRANSMITTING STYLUS, the contents of which are incorporated herein by reference.

BACKGROUND

It is known to use ultrasound to carry our location determination, e.g., on a working surface such as a whiteboard or a projection screen. I call such systems pen-stroke annotation capture systems. The term stylus is used in this description to refer to a movable pointing device that includes a transmitter of ultrasound and of electromagnetic signals, e.g., infrared (IR) signals. A capture system placed near the working surface in which location is to be determined includes ultrasound receivers for receiving and sensing the transmitted ultrasound and a sensor for receiving infrared signals. The infrared signals provide a time reference. Such a stylus may be marking, e.g., a pen or retrofitted pen, or a non-marking pointing device used for interaction, or an erasing device. Various methods can be used to take into account the difference in time of arrival of the ultrasound transmitted from the stylus to the two (or more) ultrasonic receivers to determine the location of the stylus/pen/pointer in the working surface. Such a capture system typically includes an interface, e.g., a USB connection or wireless connection, to send information to a computer. Such a system, in combination with the computer, captures the pen strokes on the computer, including the color of the pen in the case of a stylus that marks, and any erasing.

Recently, there has been widespread use of a location determining system with a projector that projects onto a screen area that becomes an active area for the stylus. Thus, by adding an electronic pen-stroke annotation capture system (in general, what I call a "capture system") that is connected to the computer, any flat surface, e.g., a whiteboard used as a projection screen area, may be converted into an area wherein pen strokes are capturable to the computer. Thus, one or more computer-generated images may be projected on the projection screen surface, and pen strokes may be drawn by the stylus over the computer generated image. Such pen strokes are then capturable by the location system and transferable to the computer. The pen strokes drawn over the projected image may be captured in the computer for later playback and analysis, including synchronized playback with the projected image or images.

Figure 1:
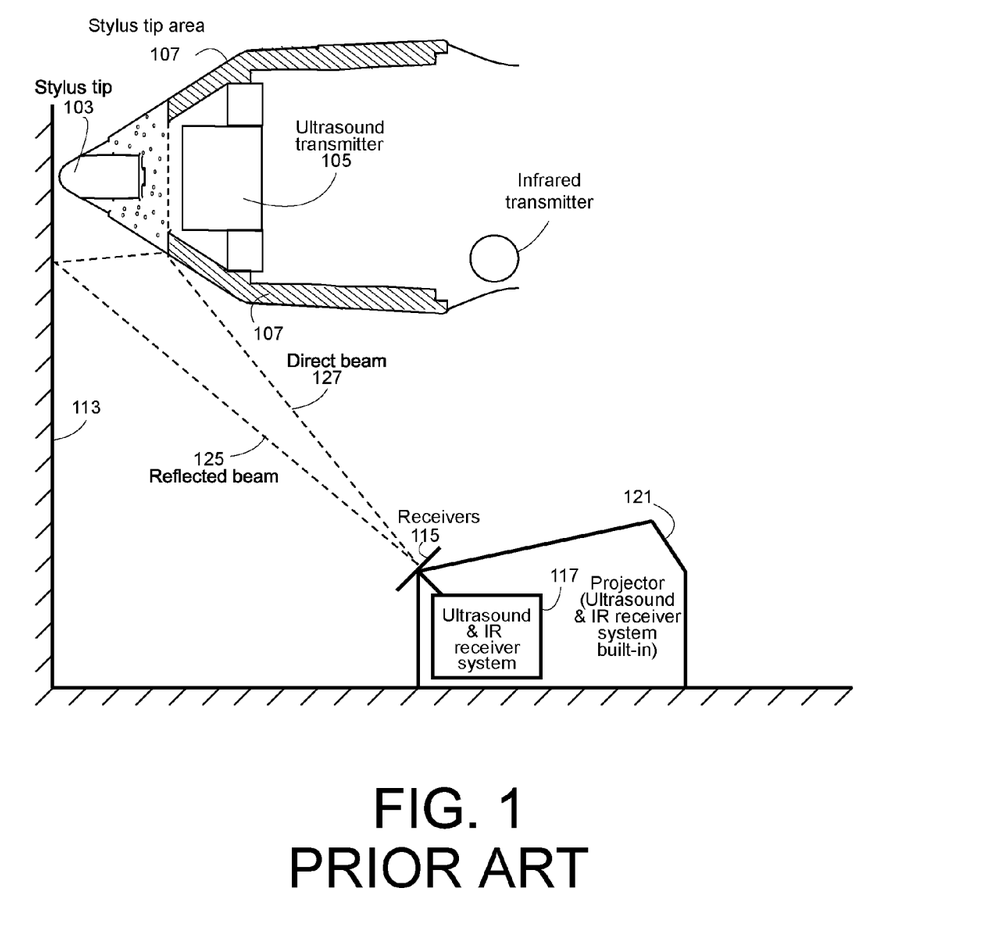
FIG. 1 shows in exaggerated and simplified form a projector embodiment on a floor some distance, typically relatively short, from a screen that forms a working surface in which the location of a pointing device (a pen or stylus) is captured.

Recently there has been a desire to have the ultrasound receivers and IR sensor not on the working surface, but rather some distance away from the surface. For example, there are several projectors that are placed away from, but still relatively close to, the working surface, which in the case of a projector, is a screen area. For example, NEC Corporation of Tokyo Japan makes a series of projectors, such as model WT610 and model WT615. Each such NEC projector is able to project images with an image diagonal of 40 inches at a surface distance of only 5½ in, accomplished with the help of an innovative highly complex mirroring system. 3M and others also make systems that are able to project an image from a short distance away from the screen. With such systems, it is possible and desirable to incorporate the ultrasound receivers and infrared receiver, as well as the location determining electronics, e.g., the ultrasound receivers and related electronics, into the projector itself. In such a case, the receivers are at a slightly different plane than the working surface, which is the screen FIG. 1 shows, in simplified and exaggerated form, a projector on the floor some relatively short distance from a screen which forms a working surface. The projector includes a sensor array including ultrasound sensors at known locations and an infrared sensor coupled to electronics and processing to determine the location of a stylus such as a pen or pointing device or erasing device that includes an ultrasound transmitter including an ultrasound transducer, and an infrared transmitter. FIG. 1 shows the tip of the pointing device in hugely magnified form.

It is desired, e.g., in the case of projecting, but also in other situations such as in the case of a whiteboard, or in the case of a flat panel display such as an LCD display or a plasma display, to have the ultrasound transmitter not be at the same plane as the working surface. There are several challenges for ultrasound based position capturing systems when the ultrasound transmitter is offset from the working surface and the ultrasound receiver is not located on the same plane as the working surface. The most serious of these issues include reflection off the working surface, stylus tip offset, and a signal strength that is too low.

Reflection Off the Working Surface

If an ultrasound receiver is not placed on the working surface, when a stylus, e.g., a pen, or pointer is transmitting an ultrasound signal, there will be two main paths for the signal rather than one path as desired: a direct signal and a reflected signal off the working surface as shown in FIG. 1. Often the phase differences of the two signals range from less than one wavelength to a few wavelengths for a 40 KHz ultrasound. The receiver picks up both the direct and the reflected signals, and when the difference is odd multiples of half wave length $(2n-1)\pi$, $n=1, 2, 3 \ldots$, the signals will tend to attenuate each other and greatly reduce the available signal with which to. The ultra sound receivers placed on the projector away from the working surface may receive different amount of interference between the direct and reflection waves, depending on the proximity and angle relative to the stylus, causing the combined wave shape differ significantly among receivers Stylus Tip Offset Differences in the angle at which the stylus is held are amplified by the tilt of the transducer from the working surface, which causes the location of the stylus tip, e.g., tip of the pen, eraser, or pointer, as resolved by the ultrasound receiver system, to change where there is different tilt.

Signal Strength is too Low

The received ultrasound signal strength is enhanced when the ultrasound waves propagate along a hard surface, e.g., along the working surface, and is attenuated when the ultrasound waves propagate directly through air. Furthermore, the signal strength will be reduced significantly when reflection of ultrasound from the working surface destructively adds into the direct signal at phase close to odd integer multiples of half of the wave length.

U.S. patent application Ser. No. 11/764,757 describes a method and a stylus. The stylus includes an acoustic transmitter at a first location and a wave directing mechanism configured to direct acoustic waves from the acoustic wave transmitter to a tip location near the end of the tip of the stylus. One version includes a waveguide. Another version includes a shaped reflector behind the acoustic transmitter shaped to focus acoustic waves from the acoustic wave transmitter to the tip location. Another version includes using an array of ultrasound transducers driven by electronics arranged to focus ultrasound energy towards the tip location. Yet another version uses an acoustic lens.

U.S. Application US 20040169439 to inventor Toda describes a stylus that includes a tip and an ultrasound transducer, either a cylindrical piezoelectric transducer having a holder and a cylindrical piezoelectric film spanning between at least two spaced apart cylindrical surfaces of a holder, or a flat transducer having a diaphragm, and a piezoelectric material disposed on a surface of the diaphragm. Toda includes a waveguide designed to focus energy on a tip.

BRIEF DESCRIPTION OF THE DRAWINGS

FIG. 1 also shows a prior art stylus.

DESCRIPTION OF EXAMPLE EMBODIMENTS

Overview

Particular embodiments include a stylus that includes a tip portion and a body portion, and that hat has a cavity. The cavity has a plurality of holes at a first end and a transmitter of acoustic waves, e.g., ultrasound waves at a second end longitudinally opposite the first end. The tip portion has a tip. The tip end is less than a quarter of a wavelength from the exit ends of the holes. When the end of the tip is placed against a working surface, the stylus is arranged to cause the transmitter to transmit acoustic waves that travel from the transmitter through the cavity, exit the holes and travel less than a quarter of a wavelength to the working surface relatively close to the tip.

Particular embodiments include a stylus comprising a housing elongated along a longitudinal axis, and including a body portion and a tip portion at one end of the housing. In one version, the tip portion is attached to (and removable from) the body portion, and in another embodiment, the tip portion is integral with the body portion. The stylus includes a tip at the tip portion for pointing at a working surface. The tip has an end for placing on the working surface. The stylus further comprises a cavity extending longitudinally including a plurality of holes at a first end closest to the tip and a second end longitudinally opposite the first end. The stylus also includes a transmitter of acoustic waves, e.g., of ultrasound located at the second end of the cavity and configured to transmit acoustic waves at a main wavelength within the cavity towards that first end having the holes. The holes have exits from the cavity through which the acoustic waves can travel towards the end of the tip. The stylus further comprises electronics to drive the transmitter of acoustic waves. The acoustic transmitter is arranged such that when driven by the electronics, and when the end of the tip is in contact with the working surface, acoustic waves emanate from the front emitting surface of the acoustic transducer towards holes in the cavity, and out of the ports towards the end of the tip. The distance between the exit of the ports and the end of the tip is less than a quarter of the main wavelength. The acoustic waves are detectible by a plurality of acoustic sensors, the sensed acoustic waves being usable to determine the location of the end of the tip on the working surface.

One stylus version includes a transmitter of electromagnetic signals.

In one version, the cavity is formed in the tip portion.

In one version, the transmitter of acoustic waves has a front emitting surface forming the second end of the cavity.

In one version, the cavity has a length in the longitudinal direction of an integral number of half the main wavelength. For example, the length of the cavity in the longitudinal direction is one main wavelength.

In one version, the holes surround the longitudinal axis. For example, in one version, there are 6 holes surrounding the longitudinal axis uniformly spread along a circle of diameter less than half the main wavelength.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

A Stylus Embodiment

The term stylus is used in this description to refer to a pointing device, whether marking, e.g., a pen or retrofitted pen, or a non-marking pointing device for pointing or erasing.

FIG. 1 shows one example of a capture system in which an embodiment of the present invention is useful. FIG. 1 shows, in simplified form, a projector 121 that includes an ultrasound receiver system 117 including at least two ultrasound sensors at known locations relative to each other and an infrared sensor, such sensors coupled to electronics and processing and operative to determine the location on the working surface of the tip 103 of a stylus that transmits ultrasound and infrared from close to the working surface. FIG. 1 shows the tip region of the pointing device in hugely magnified form. Such a region includes an end tip 103 and another stylus tip area 107 at which is located an ultrasound transmitter 105 including an ultrasound transducer. The transmitter in FIG. 1 is inside a cylindrical can and emits ultrasound towards the front (tip) direction. One receiver at the projector is shown as receiver 115. Suppose this is an ultrasound sensor. As is seen in exaggerated form in FIG. 1, the sensor 115 might sense both a direct beam 127, and a reflected beam 125 reflected off the working surface 113. Additional issues include stylus tip offset when the stylus is at an angle to the surface of the projector screen.

Figure 2:
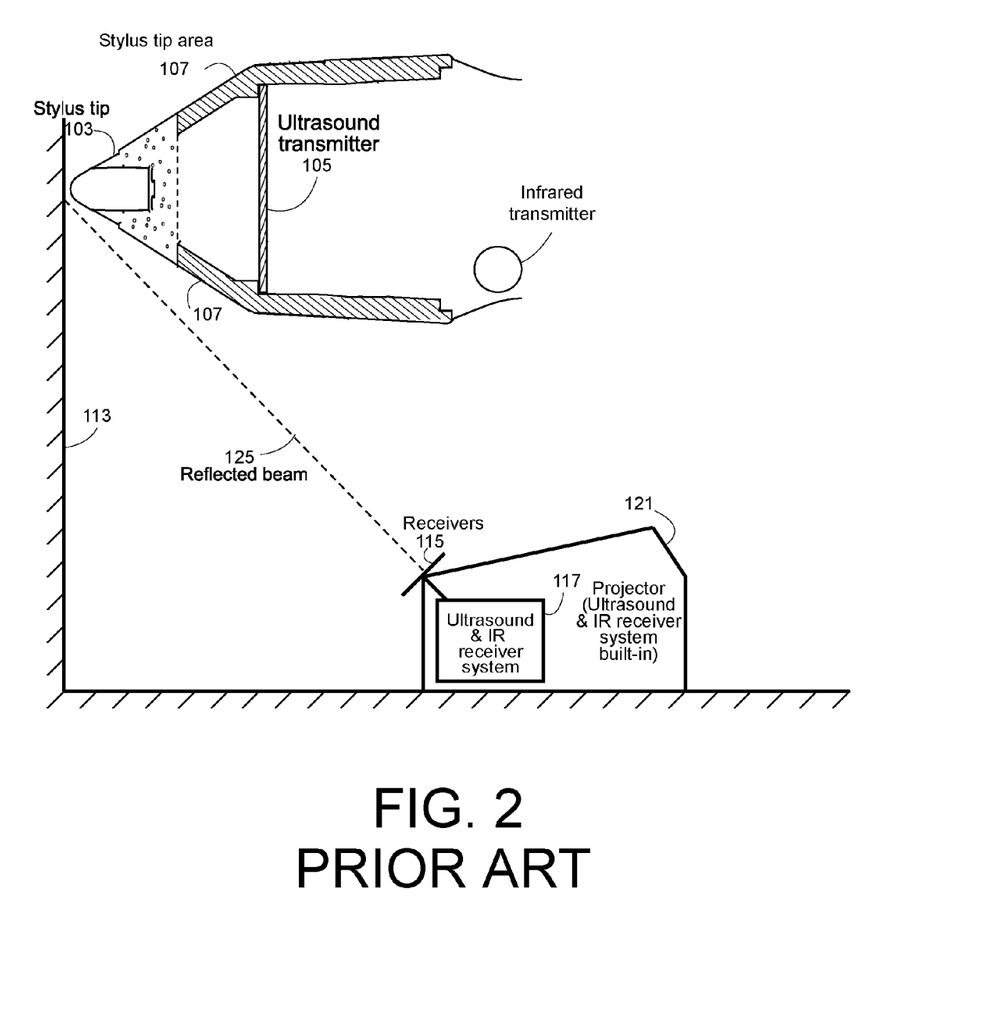
FIG. 2 shows a drawing similar to that of FIG. 1, in exaggerated and simplified form, with a different prior art stylus.

FIG. 2 shows another example of a capture system in which an embodiment of the present invention is useful, but with a different prior art stylus. Again, the tip region of a pointing device is shown in hugely magnified form. In this stylus, the ultrasound transmitter is planar, e.g., as a disk. In such a situation, issues may come up when the stylus is at an angle to the surface of the projector screen.

Figure 3:
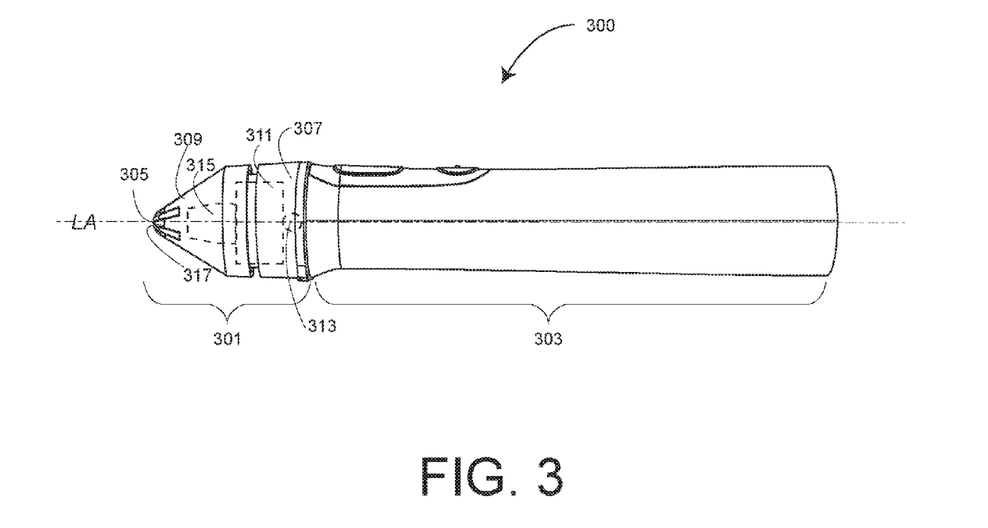
FIG. 3 shows a side view of one embodiment of a stylus that includes features of the present invention.

FIG. 3 shows a side view of one embodiment of a stylus 300 that includes features of the present invention. The stylus 300 has a housing elongated along a longitudinal axis denoted LA, and includes a body portion 303 and a tip portion 301. The stylus includes a tip 305 at the tip end of the tip portion, a transmitter 311 of acoustic waves, e.g., ultrasound, a transmitter 313 of infrared (IR) signals, electronics to drive the transmitter 311 of acoustic waves, and electronics to drive the transmitter 313 of IR signals. The transmitter 311 of acoustic waves transmits at a main frequency, the waves having a main wavelength through air. In one embodiment, the acoustic waves are ultrasound waves at a main frequency is 40 kHz and the main wavelength is 8.28 mm (rounded to two decimal points) at room temperature. In alternate embodiments, different types, e.g., wavelengths of acoustic waves can be used. In alternate embodiments, any electromagnetic signal other than IR can be used. The stylus also includes a switch, one or more buttons to activate different functions, and a power source, e.g., a battery connected to the acoustic transmitter and the drive electronics for the transmitter 311 of acoustic waves and the transmitter 313 of IR pulses. The tip portion 301 has the tip end where the tip 305 is mounted or attached, and a body portion end opposite in the longitudinal direction from the end for the tip. The tip portion can be attached to or is integral with the body portion. In the embodiment shown, the tip portion is attached to (and can be detached from) the body portion, and includes a front casing, called a tip base 309, the tip 305, and an element 307 with an infrared window in which is an IR transmitter. A cavity 315 is formed between a front emitting surface of the ultrasound transmitter 311 and a plurality of holes forming ports through which the ultrasound can exit the front of the stylus towards the end of the tip 305. One of the holes is shown as reference numeral 317. When the end of the tip 305 is pressed against a working surface, the switch activates the drive electronics to cause pulses of IR to exit the infrared window 307 and pulses of ultrasound to exit the plurality of holes 317 close to the end of the tip 305.

The ultrasound is for sensing at a plurality of sensors. In many applications, the plurality of sensors is not even approximately co-planar with the working surface, but rather is a distance away. The distance may be as short as 5 cm and can be much larger. The distance means that the ultrasound that is detected and used for determining the location of the stylus tip is energy reflected off the working surface. It is therefore important for the stylus to be designed to be operable even when tilted to not be perpendicular to the working surface. Furthermore, it is important for the stylus to be designed such that the sensors pick up ultrasound reflected from the region of the tip end and not direct energy from the stylus. For this, it is desired that the ultrasound be directed towards the tip end of the stylus. U.S. application Ser. No. 11/764,757 describes, inter alia, a stylus with a wave directing mechanism configured to direct acoustic waves from the acoustic wave transmitter to a tip location near the end of the tip of a stylus. The wave directing mechanism can be a waveguide, an acoustic lens, or a shaped reflector behind the ultrasound transmitter shaped to focus acoustic waves from the acoustic wave transmitter to the tip location, by having the ultrasound transmitter include an array of ultrasound transducers driven by electronics arranged to focus ultrasound energy towards the tip location. U.S. Application publication US 20040169439 also describes a waveguide designed to focus energy on a tip.

One feature of the present invention is an inexpensive way of directing acoustic energy to a relatively small area near the end of the tip by careful design rather than by use of any additional wave directing mechanism.

Figure 4A:
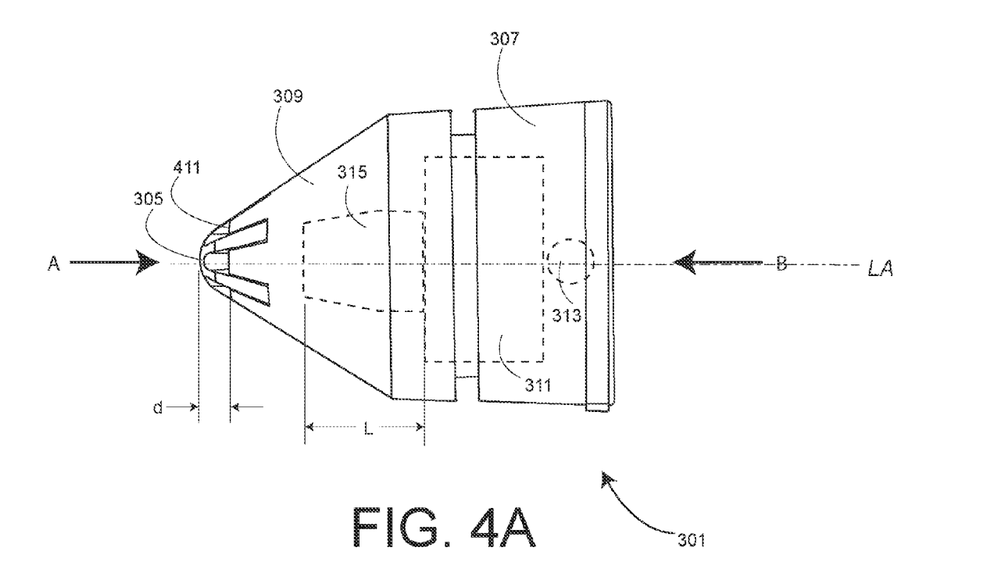
FIGS. 4A to 4E show different views of an embodiment of a tip portion of the stylus embodiment of FIG. 3.
Figure 4B:
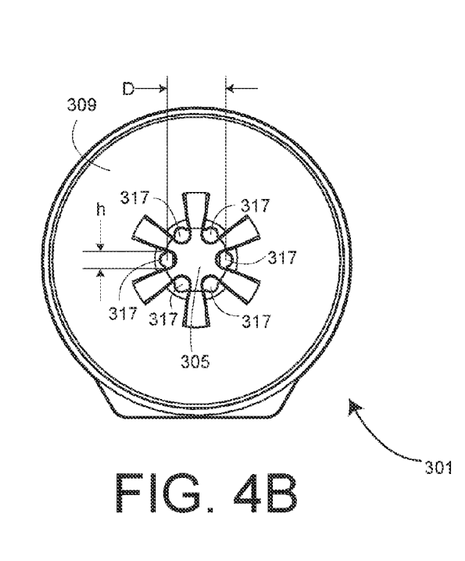
Figure 4C:
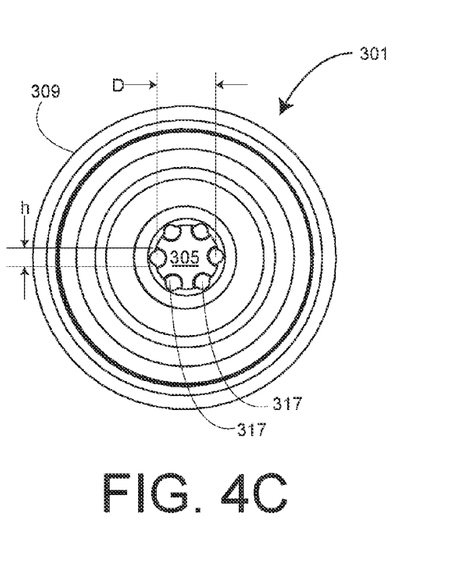
Figure 4D:
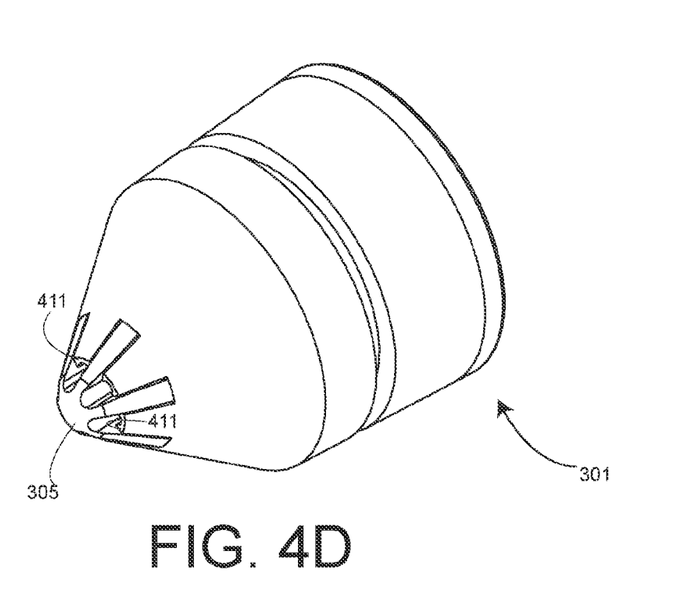
Figure 4E:
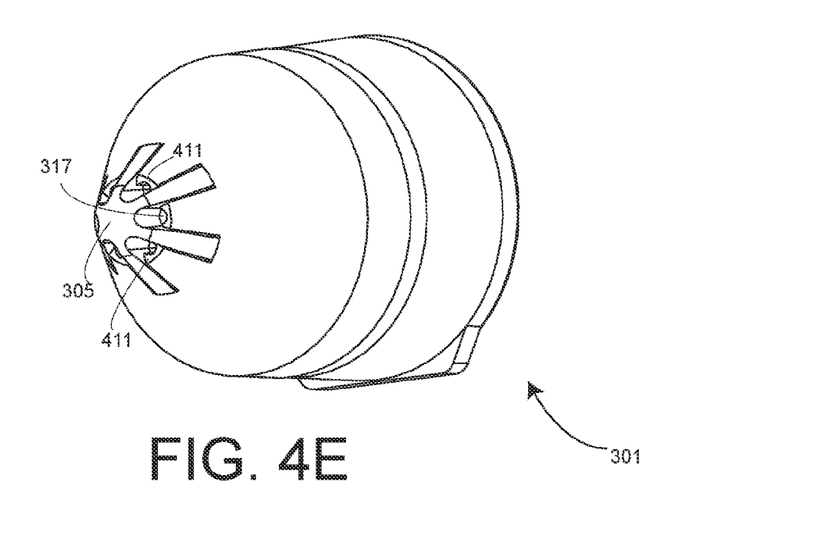

FIGS. 4A-4E show the tip portion 301 in more detail. FIG. 4A is a side view of the tip portion 301. FIG. 4B is an end view of the tip portion 301 towards the rear in the view direction shown as A in FIG. 4A. FIG. 4C is an end view of the tip portion 301 from the back towards the rear in the view direction shown as B in FIG. 4A, without the IR window portion 307 and without an internal mounting element. FIGS. 4D and 4E are perspective views of the tip portion 301.

Referring to the side view FIG. 4A., the tip portion includes the tip base 309, the IR window portion 307, and a tip 305 that includes fingers that have pegs fit into holes in the tip base 309. There is a plane 411 from which the ultrasound exits via the plurality of holes 317. One feature of the invention is that the holes are relatively close, so that the area on the working surface that the ultrasound hits is relatively small. The ultrasound from the transmitter 311 has a main wavelength. Another feature of the invention is that the distance from the exit plane 411 to the end of the tip, and therefore to the working surface, is less than a quarter of a wavelength (the main wavelength), so that the round trip travelled by a wave from the exit plane back to the exit plane is less than one half of the main wavelength. This ensures no destructive interference of incident waves with reflected waves. In FIG. 4A, this distance is denoted by d. For ultrasound at 40 kHz, since the wavelength at room temperature is approximately 8.3 mm, in one embodiment of the invention, d is 2 mm.

Another feature of the invention is that the cavity length along the longitudinal axis LA is an integer number of half-wavelengths, so that an ultrasound wave exiting the front (tip end) of the transmitter 311 that bounces off the front part of the cavity 315 travels back and forth an integer number of wavelengths when it first reaches the front (tip end) of the transmitter 311. The cavity length along the longitudinal axis LA is denoted by L in the drawings. In one embodiment, L is one wavelength, e.g., 8.28 mm for ultrasound at 40 kHz.

While there are many ways to construct a stylus with these properties, in one embodiment, the holes 317 are formed from an opening through the tip base 309 and gaps in parts of the tip. Referring now to FIGS. 4B and 4C, in one embodiment, there are six holes, so that six narrow beams of ultrasound travel towards the working surface at the end of the tip when the transmitter is activated by the switch. In one embodiment, the diameter of the holes, denoted h, is 1 mm. In one embodiment, the six holes are evenly distributed with their respective centers on a circle of diameter denoted D of less than one half the main wavelength. In one version, the holes are 2 mm apart. In one embodiment in which the main ultrasound frequency is 40 kHz, D is about 3.5 mm.

Figure 5A:
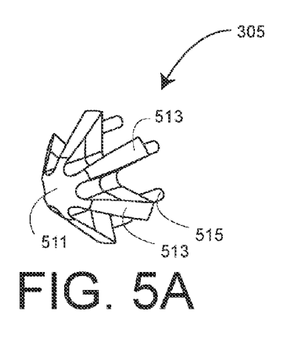
FIGS. 5A to 5E show perspective views of the mechanical components of an embodiment of the tip portion of the stylus embodiment of FIG. 3.
Figure 5B:
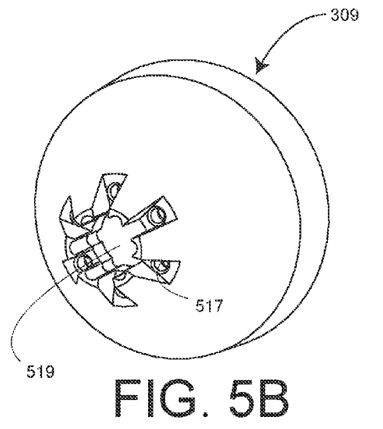

FIGS. 5A to 5E show perspective views of the mechanical components of one embodiment of the tip portion 301. FIG. 5A shows the tip 305 that in one embodiment is made from polyoxymethylene (POM), also known as acetal, polyacetal, and polyformaldehyde. In alternate embodiments, other materials, such as polytetrafluoroethylene (PTFE) can be used. The tip 305 includes a tip end 511 and six fingers 513 that each include a peg 515. FIG. 5B shows the tip base 309 is made out of acrylonitrile butadiene styrene (ABS), polycarbonate, or other hard material and includes grooves for the tip fingers 513 with holes 517 designed such that the tip pegs 515 fit tightly into such holes 517. The tip base 309 includes an opening 519 in the front. The tip 305 with its tip fingers 513 cover most of the opening 519, leaving the six holes 317 formed from the part of the opening 519 not covered by the tip 305.

Figure 5C:
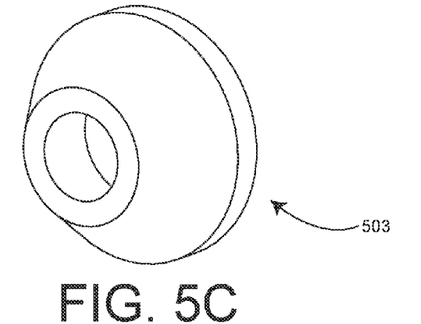

FIG. 5C shows a ring gasket 503 made of rubber or similar material that lines the interior of the tip base 309. The interior of the ring gasket forms the side walls of the cavity 315. The back surface is designed so that the ultrasound transmitter presses against it and causes the cavity to be acoustically sealed, other than exit ports in the case of the transmitter 311 can and the exits of holes 317.

Figure 5D:
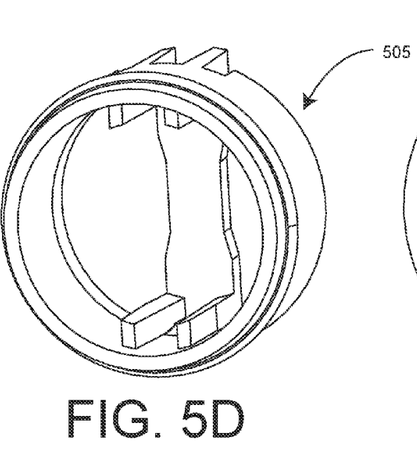

FIG. 5D shows a securing element 505 designed to secure the case of the transmitter 311, which in one embodiment is in the form a cylindrical aluminum can, within the tip portion, including imparting a force against the ring gasket to ensure acoustic sealing.

Figure 5E:
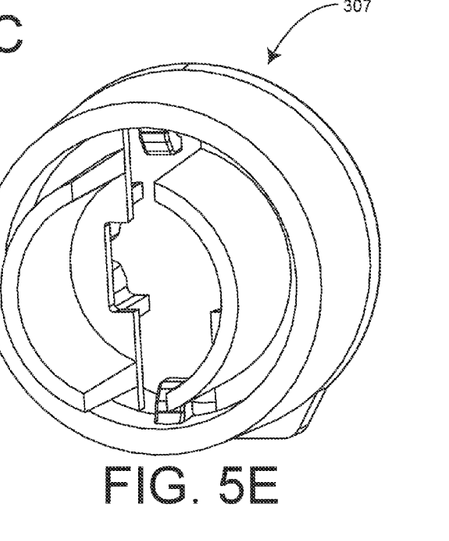

FIG. 5E shows the portion 307 that includes the IR window through which IR energy exits.

Figure 6A:
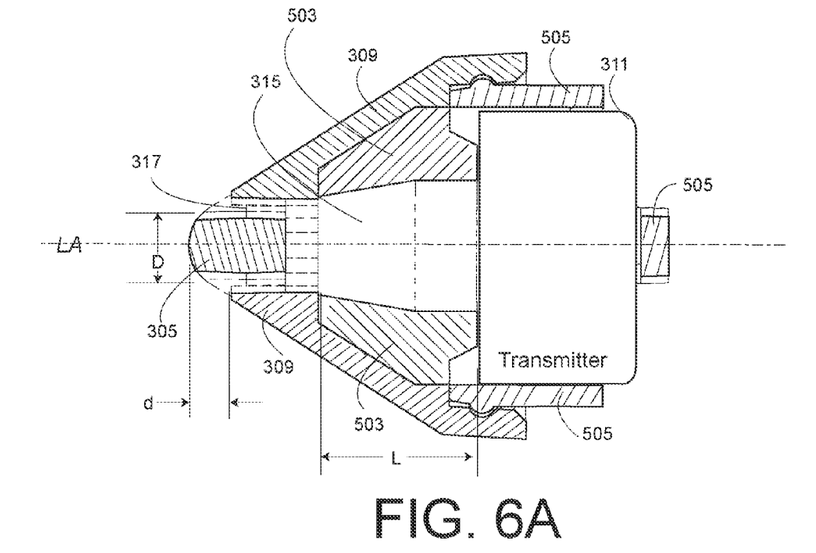
FIGS. 6A and 6B show two cross-sectional views of the tip portion shown in FIGS. 4A-4E and 5A-5E.
Figure 6B:
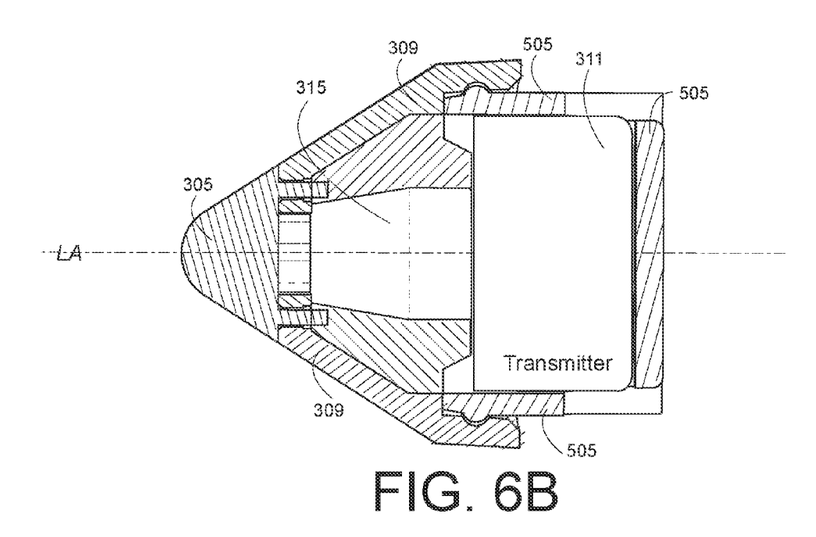

FIGS. 6A and 6B show two cross-sectional views of the tip portion 301 excluding the IR window portion 307 in order to show how the elements of FIGS. 5A to 5D fit together with the aluminum can that includes the transmitter 311. The interior of the transmitter, including the ultrasound transducer therein, is not shown in the drawings. FIGS. 6A and 6B are rotated 90 degrees to each other around the longitudinal axis.

One embodiment of the transmitter 311 includes a piezoelectric element encapsulated in the aluminum can. The transmitter 311 in such an embodiment includes a cone that resonates at 40 kHz. The transmitter 311 in one embodiment is model SR40-10SE made by Nippon Ceramic Co. Ltd. of Tottori-Shi, Japan, which has a resonant frequency of 40 kHz. Of course, other forms an ultrasound transmitter can be used.

In one embodiment, the tip 305 is replaceable, as is the tip base 309. Of course, many variations are possible. The tip portion may be differently constructed. The tip portion may be integral with the body portion. A different style of transducer may be used.

Thus has been described a stylus that includes an acoustic wave transmitter and an electromagnetic energy transmitter for use in location determining on a working surface by acoustic energy being sensed by a set of two or more acoustic receivers located on a plane some distance from the plane of the working surface. The embodiments described lend themselves to economic design, and should be less expensive than alternate solutions that include a wave directing mechanism such as a waveguide, a shaped reflector, an acoustic lens, or use of an array of transducers with beam forming electronics.

Note that the design presented herein does not preclude use of a wave directing mechanism. However, one is not necessary.

While the present design includes six exit ports, more or fewer ports may be used in alternate embodiments. While the cross-section of the cavity used in the embodiments described herein is circular, alternate embodiments may have different cross-sections. While the embodiments described herein use a transmitter with 40 kHz resonant frequency which is a horn-type in a can, alternate embodiments can use a different frequency, and also a different form of transducer, such as a planar transducer. Furthermore, while the embodiments described herein have exit ports that are formed by gaps between a hole in the tip base and the tip, alternate embodiments can use a tip portion that has holes drilled or otherwise formed. Furthermore, while embodiments of the invention use a ring gasket, alternate embodiments can use other elements for forming an acoustic seal. One such alternate embodiment uses an O-ring. The cavity is formed by the interior surface of the walls of an alternate tip base.

Furthermore, it should be noted that while the embodiments described herein use infrared, and thus each include an infrared transmitter, in general, a transducer of electromagnetic energy other than infrared, e.g., RF energy, may be used in alternate embodiments.

Note that the stylus is shown having a tip portion and a body portion, with the cavity is in the tip portion. In general, the cavity is in the stylus near the tip. There may not be a separate tip portion and body portion.

Unless specifically stated otherwise, as apparent from the following description, it is appreciated that throughout the specification discussions utilizing terms such as "processing," "computing," "calculating," "determining" or the like, may refer to, without limitation, the actions and/or processes of hardware, e.g., an electronic circuit, a computer or computing system, or similar electronic computing device, that manipulate and/or transform data represented as physical, such as electronic, quantities into other data similarly represented as physical quantities.

Note that when a method is described that includes several elements, e.g., several steps, no ordering of such elements, e.g., of such steps is implied, unless specifically stated.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the DESCRIPTION OF EXAMPLE EMBODIMENTS are hereby expressly incorporated into this DESCRIPTION OF EXAMPLE EMBODIMENTS, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All U.S. patents, U.S. patent applications, and International (PCT) patent applications designating the United States cited herein are hereby incorporated by reference. In the case the Patent Rules or Statutes do not permit incorporation by reference of material that itself incorporates information by reference, the incorporation by reference of the material herein excludes any information incorporated by reference in such incorporated by reference material, unless such information is explicitly incorporated herein by reference.

Any discussion of other art in this specification should in no way be considered an admission that such art is widely known, is publicly known, or forms part of the general knowledge in the field at the time of invention.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting of only elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the diagrams and operations may be interchanged among functional blocks. Steps may be added to or deleted from methods described within the scope of the present invention.

We claim:

1. A stylus comprising:
  a housing elongated along a longitudinal axis, and including a body portion and a tip portion at one end of the housing, the tip portion being attached to or integral with the body portion;
  a tip at the tip portion for pointing at a working surface, the tip having an end for placing on the working surface;
  a cavity extending longitudinally within the housing, and having a first end closest to the tip and a second end longitudinally opposite the first end, the first end including a plurality of holes;
  a transmitter of acoustic waves located at the second end of the cavity and having front emitting surface facing the first end forming said second end, the acoustic-wave transmitter configured to transmit acoustic waves at a main wavelength within the cavity towards the first end having the holes, the holes forming ports having exits from the cavity through which the acoustic waves can travel from the cavity towards the end of the tip; and
  electronics to drive the transmitter of acoustic waves, including a power source for the electronics;
  wherein the acoustic transmitter is arranged such that when driven by the electronics, and the end of the tip is in contact with the working surface, acoustic waves emanate from the front emitting surface of the acoustic transducer towards the holes in the cavity, and out of the port exits towards the end of the tip,
  wherein the distance between the exit of the ports and the end of the tip is less than a quarter of the main wavelength, and
  wherein the acoustic waves emitted from the exit of the ports are reflected by the working surface, travel through the air away from the working surface, and after reflection are detectible by a plurality of acoustic sensors that are spaced from the surface, the acoustic waves detected by the sensors being usable to determine the location of the end of the tip on the working surface.

2. The stylus as recited in claim 1, further comprising a transmitter of electromagnetic signals coupled to the electronics, the electronics further operative to drive the transmitter of electromagnetic radiation.

3. The stylus as recited in claim 1, wherein the cavity is formed in the tip portion.

4. The stylus as recited in claim 3, wherein the cavity has a length in the longitudinal direction of an integral number of half the main wavelength.

5. The stylus as recited in claim 4, wherein the length of the cavity in the longitudinal direction is one main wavelength.

6. The stylus as recited in claim 1, wherein the transmitter is configured to transmit ultrasound.

7. The stylus as recited in claim 6, wherein the ultrasound has a main frequency of 40 kHz.

8. The stylus as recited in claim 1, wherein the holes surround the longitudinal axis.

9. The stylus as recited in claim 1, wherein the transmitter is configured to transmit ultrasound, and wherein there are 6 holes surrounding the longitudinal axis uniformly spread along a circle of diameter less than half the main wavelength.

10. The stylus as recited in claim 1, further comprising a switch mechanically coupled to the tip and electrically coupled to the electronics, such that when the end of the tip is pressed against the working surface, the switch activates the electronics to cause acoustic waves to emanate from the front emitting surface of the acoustic transducer towards holes in the cavity, and out of the ports towards the end of the tip.

11. The stylus as recited in claim 2, further comprising a switch mechanically coupled to the tip and electrically coupled to the electronics such that when the end of the tip is pressed against the working surface, the switch activates the electronics to drive the transmitter of electromagnetic radiation to cause pulses of electromagnetic radiation to emanate from the stylus.

* * * * *